US012687048B2

(12) United States Patent (10) Patent No.: US 12,687,048 B2
Becht, III et al. (45) Date of Patent: Jul. 21, 2026

(54) SYSTEM TO LOCK AND UNLOCK ONE OR MORE COMPARTMENTS IN A VEHICLE

(71) Applicant: Accelerated Solutions Group, L.L.C., Houston, TX (US)

(72) Inventors: Charles Eugene Becht, III, Houston, TX (US); Gabriel Lane Mitchell, Houston, TX (US)

(73) Assignee: Accelerated Solutions Group LP, Houston, TX (US)

( * ) Notice: Subject to any disclaimer, the term of this patent is extended or adjusted under 35 U.S.C. 154(b) by 0 days.

(21) Appl. No.: 18/793,287

(22) Filed: Aug. 2, 2024

(65) Prior Publication Data

US 2024/0392613 A1 Nov. 28, 2024

Related U.S. Application Data

(63) Continuation of application No. 17/960,658, filed on Oct. 5, 2022, now Pat. No. 12,071,791.

(51) Int. Cl.
| | |
|---|---|
| *E05B 77/54* | (2014.01) |
| *B60R 25/01* | (2013.01) |
| *B60R 25/24* | (2013.01) |
| *E05B 83/28* | (2014.01) |
| *E05B 83/30* | (2014.01) |
| *G07C 9/00* | (2020.01) |
| *H04L 12/40* | (2006.01) |

(52) U.S. Cl.
CPC .............. *E05B 77/54* (2013.01); *B60R 25/01* (2013.01); *B60R 25/24* (2013.01); *E05B 83/30* (2013.01); *G07C 9/00309* (2013.01); *H04L*

*12/40* (2013.01); *E05B 83/28* (2013.01); *G07C 2009/00769* (2013.01); *G07C 2009/00984* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 3,643,479 A | | 2/1972 | Solow | |
| 3,648,491 A | * | 3/1972 | Kennard | E05B 79/20 |
| | | | | 70/432 |
| 3,710,316 A | * | 1/1973 | Kromer | B60R 25/04 |
| | | | | 361/172 |
| 4,702,094 A | | 10/1987 | Peterson | |
| 4,848,509 A | | 7/1989 | Bruhnke et al. | |
| 5,111,902 A | * | 5/1992 | Sundeen | E05B 77/48 |
| | | | | 180/281 |

(Continued)

*Primary Examiner* — Carlos Garcia
(74) *Attorney, Agent, or Firm* — Akerman LLP

(57) ABSTRACT

A wired or wireless vehicle locking system including a processor capable of determining that a first condition has occurred and send a lock signal to a lock mechanism of a door to a compartment or sub-compartment to lock the door and prevent access to the compartment or sub-compartment. The first condition may include: (i) determining that an ignition system of the vehicle has been placed in an off-state, (ii) determining that a key has been removed from the ignition system, or (iii) determining that a transmission of the vehicle has been placed in a park position. The processor may also determine that a second condition has occurred and send an unlock signal to the lock mechanism to unlock the door and enable access to the compartment or sub-compartment.

22 Claims, 5 Drawing Sheets

(56)     References Cited

U.S. PATENT DOCUMENTS

| | | | |
|---|---|---|---|
| 6,532,406 B1 | 3/2003 | Schmedding | |
| 9,475,369 B2 * | 10/2016 | Sugiura | B60R 25/2054 |
| 9,902,367 B2 | 2/2018 | Lee | |
| 10,107,026 B2 * | 10/2018 | Dezorzi | E05F 15/76 |
| 10,544,608 B2 | 1/2020 | Stoia et al. | |
| 10,723,275 B2 * | 7/2020 | Skikun | E05B 65/0075 |
| 10,981,541 B2 | 4/2021 | Golduber | |
| 11,001,228 B2 * | 5/2021 | Skikun | B60R 25/102 |
| 11,721,144 B2 | 8/2023 | Salter | |
| 11,832,743 B2 | 12/2023 | Santangeli | |
| 11,851,279 B1 | 12/2023 | Chinoy | |
| 12,374,176 B2 * | 7/2025 | Salter | G07C 9/00896 |
| 12,391,211 B2 * | 8/2025 | Landry | B60R 25/102 |
| 2005/0151628 A1 * | 7/2005 | Becker | B60R 25/1003 |
| | | | 348/148 |
| 2009/0038352 A1 * | 2/2009 | Yamaguchi | E05B 83/30 |
| | | | 70/237 |
| 2014/0309842 A1 | 10/2014 | Jefferies | |
| 2014/0340032 A1 * | 11/2014 | Curtis | H02J 50/12 |
| | | | 320/108 |
| 2019/0017299 A1 * | 1/2019 | Capalau | E05B 77/30 |
| 2022/0079368 A1 * | 3/2022 | Hall | B62D 31/025 |
| 2022/0180679 A1 | 6/2022 | Wisnia | |

* cited by examiner

100

| KEY 117 | KEY FOB 116 |

FRONT 104

VEHICLE 102

| SELECTOR 107 | LOCK M. 112(1) |

| VEHICLE LOCKING SYSTEM 108 | IGNITION SYSTEM 109 | | COMP. 110(1) | S-C 114(1) |

| DOORS 120 | SIGNAL 118(1) | SIGNAL 118(2) |

BUS 122

| LOCK M. 112(2) | LOCK M. 112(3) | LOCK M. 112(4) |

| SUB-COMP. 114(2) | SUB-COMP. 114(3) | SUB-COMP. 114(4) |

COMPARTMENT 110(2) (E.G., UNDER DRIVER'S SEAT)

COMPARTMENT 110(3) (E.G., CONSOLE)

COMPARTMENT 110(4) (E.G., UNDER PASSENGER SEAT)

| LOCK M. 112(5) | LOCK M. 112(6) |

| SUB-COMP. 114(5) | SUB-COMP. 114(6) |

COMPARTMENT 110(5) (UNDER REAR SEAT)

COMPARTMENT 110(6) (UNDER REAR SEAT)

LOCK MECHANISM 112(7)

COMPARTMENT 110(7) (E.G., BEHIND REAR SEATS)

SUB-COMP. 114(7)

LOCK MECHANISM 112(8)

SUB-COMPARTMENT (S-C) 114(8)

COMPARTMENT 110(8) (E.G., IN TRUNK/HATCH AREA)

REAR 106

DETERMINE THAT A FIRST CONDITION HAS OCCURRED
(E.G., FOB LOCK, IGNITION OFF, VEHICLE IN PARK ETC.)
302

SEND A LOCK SIGNAL TO A LOCK MECHANISM ASSOCIATED WITH A COMPARTMENT
(OR A SUB-COMPARTMENT)
304

OVERRIDE SET?
306

No

YES

KEEP THE LOCK MECHANISM IN AN UNLOCKED STATE
308

TRANSITION THE LOCK MECHANISM FROM THE UNLOCKED STATE TO A LOCKED
STATE
310

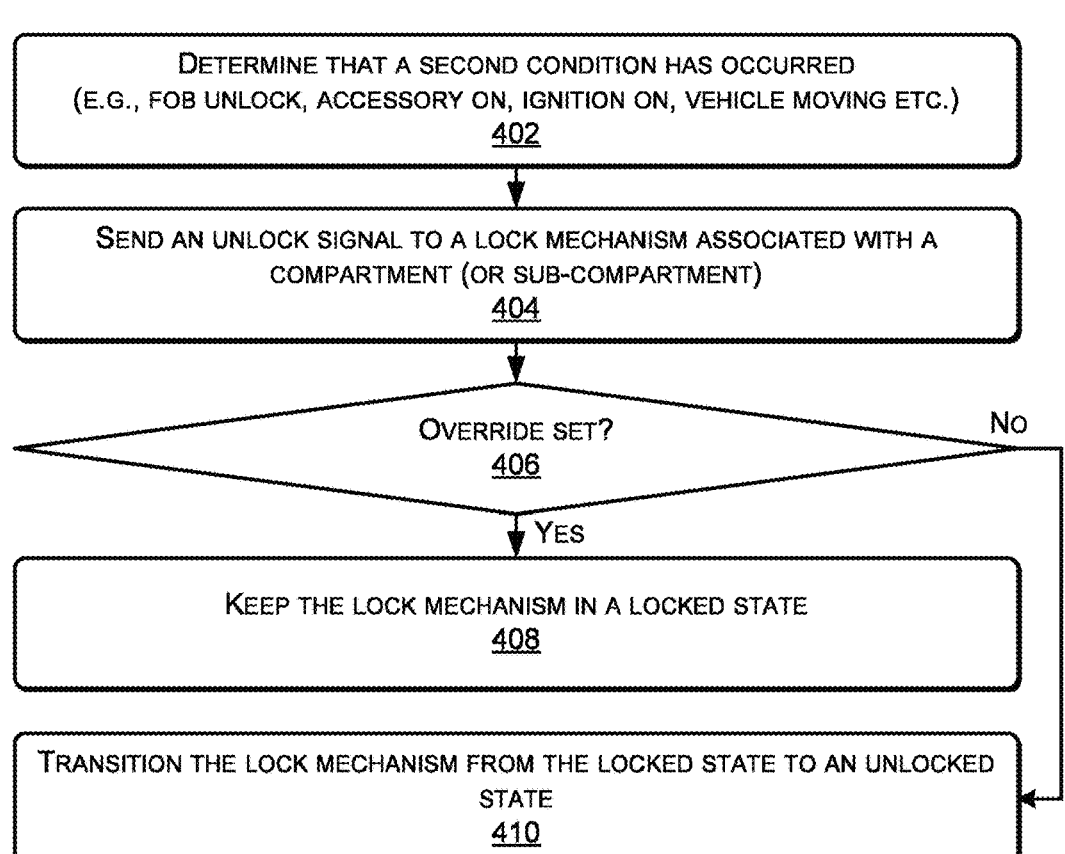
FIG. 4

SYSTEM TO LOCK AND UNLOCK ONE OR MORE COMPARTMENTS IN A VEHICLE

BACKGROUND OF THE INVENTION

Field of the Invention

This invention relates to a system to lock and unlock one or more compartments or sub-compartments (e.g., in-vehicle safes) located in one or more locations in a vehicle.

Description of the Related Art

One or more occupants (e.g., a driver and zero or more passengers) of a vehicle may have occasion to store valuables in the vehicle. For example, if the occupants plan to undertake one or more types of activities, such as exercising (e.g., walking, running, swimming, or the like) outdoors or in a gym, then the occupants may store their valuables in the vehicle. The valuables may include a wallet, a purse, a watch, a smartphone, a computing device (e.g., tablet or laptop), or another type of object having monetary and/or sentimental value. However, if the occupants store valuables in the vehicle, a thief can relatively easily gain access (e.g., by breaking a window, accessing the lock mechanism of a door, or the like) to the interior of vehicle and remove the valuables. Even if the vehicle has an alarm system (or a vehicle locking system) that that raises an alarm when triggered by the thief, the valuables can often be removed from the vehicle very quickly, such that the thief and the valuables are long gone by the time the occupants, after hearing the alarm, return to the vehicle. Thus, theft of valuables from a locked vehicle is a common occurrence that affects many people.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a vehicle may include a communication bus, a vehicle locking system connected to the communication bus, one or more processors, and one or more non-transitory storage media to store instructions executable by the one or more processors to perform various operations. For example, the operations include determining that a first condition has occurred. The operations include sending, via the communication bus, a lock signal to a lock mechanism of a door to a compartment or sub-compartment to cause the lock mechanism to transition to a locked state based at least in part on the lock mechanism receiving the lock signal via the communication bus. The locked state of the lock mechanism prevents the door from being opened to access the compartment or sub-compartment. Determining that the first condition has occurred may include wirelessly receiving, by the vehicle locking system, a first instruction from a key fob associated with the vehicle and determining that the first instruction comprises a lock instruction. Determining that the first condition has occurred may include: (i) determining that an ignition system of the vehicle has been placed in an off-state, (ii) determining that a key has been removed from the ignition system, or (iii) determining that a transmission of the vehicle has been placed in a park position. The operations may include determining that a second condition has occurred. The operations may include sending, via the communication bus, an unlock signal to the lock mechanism of the door to the compartment or sub-compartment to cause the lock mechanism to transition to an unlocked state based at least in part on the lock mechanism receiving the unlock signal via the communication bus. The unlocked state of the lock mechanism enables the door of the compartment or sub-compartment to be opened to access the compartment or sub-compartment. Determining that the second condition has occurred may include wirelessly receiving, by the vehicle locking system, a second instruction from a key fob associated with the vehicle and determining that the second instruction comprises an unlock instruction. Determining that the second condition has occurred may include: (i) determining that an ignition system of the vehicle has been placed in an on-state, (ii) determining that the ignition system has been placed in an accessory-state, or (iii) determining that a speed of the vehicle is greater than a predetermined threshold. The operations may include determining that the second condition has occurred and determining whether an override function associated with the compartment or sub-compartment has been set. The override function may be configurable via a system (e.g., infotainment system) that is internal to the vehicle, an external source (e.g., Bluetooth), or another technique. Based at least in part on determining that the override function associated with the door to the compartment or sub-compartment has not been set, the operations may include sending an unlock signal to the lock mechanism of the door to the compartment or sub-compartment. Based at least in part on determining that the override function associated with the compartment or sub-compartment has been set, the operations may include not sending the unlock signal to the lock mechanism of the door to the compartment or sub-compartment. The operations may include receiving an unlock instruction from an override function associated with the compartment or sub-compartment and sending an unlock signal to the lock mechanism of the door to the compartment or sub-compartment to cause the lock mechanism to transition to an unlocked state. The unlocked state of the lock mechanism enables the door to be opened to access the compartment or sub-compartment.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 1 is a block diagram of a system that includes a vehicle with one or more lockable compartments (or sub-compartments), according to some embodiments.

FIG. 4 is a flowchart of a process that includes transitioning a lock mechanism from an unlocked state to a locked state, according to some embodiments

DETAILED DESCRIPTION

Figure 2A:
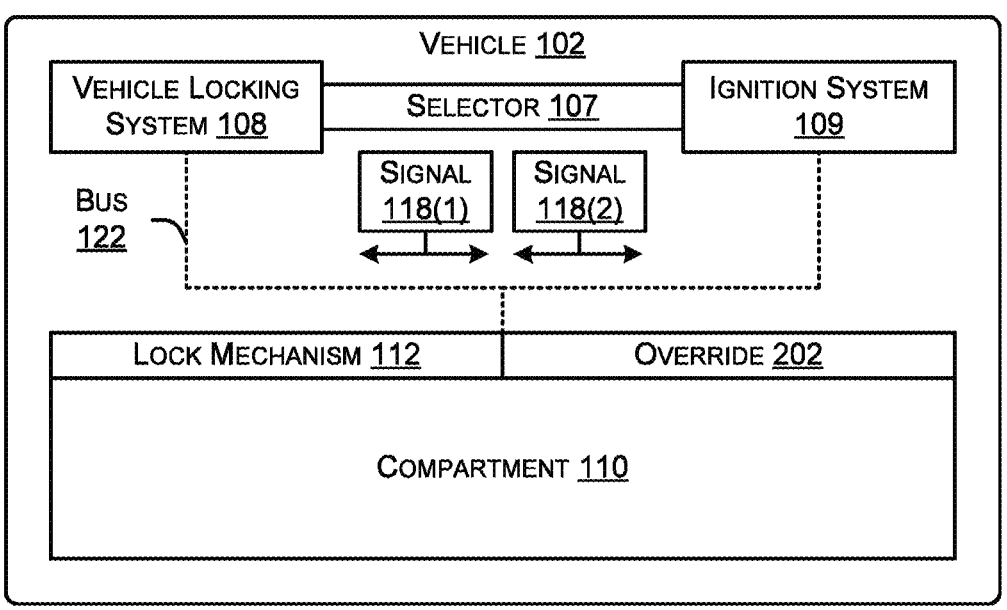
FIG. 2A is a block diagram of a compartment with an override function, according to some embodiments.

The systems and techniques described herein provide one or more lockable compartments or sub-compartments in a vehicle. The lockable compartments are located inside (e.g., interior) of the vehicle and are configured to automatically (e.g., without human interaction) lock and unlock doors of the compartments when particular conditions are satisfied. The lockable compartments may include an existing compartment in the vehicle, such as, for example, a glove box (also referred to as a glove compartment), a console (e.g., a compartment located between the driver's seat and the front passenger's seat), or the like. The lockable compartments may include one or more compartments located in the vehicle in particular locations, such as, for example, under the driver's seat, under the front passenger's seat, under one or more of the rear seats, behind the rear seats, in a map pocket of one or more doors, underneath a false floor in the trunk area or the hatch area, or another area inside a vehicle capable of housing a compartment (or sub-compartment). Some of the compartments, such as the glove box and console, may be compartments in the vehicle that were non-lockable in previous models of the vehicle but that have had a locking mechanism, as described herein, added to the compartment. Others of the compartments (or sub-compartments) may be added to a previously unutilized area, such as below the front seats, behind the rear seats, under the false floor in the trunk area or hatch area, or the like.

In some cases, at least one of the lockable compartments may be a sub-compartment within a compartment. For example, the console typically includes a hinged lid that enables access to the interior of the console. The interior of the console may include a lockable sub-compartment (e.g., a sub-compartment with a lockable door). In this way, the hinged lid may enable an occupant of the vehicle to access (1) the lockable sub-compartment to store and retrieve valuables and (2) a remaining (e.g., non-lockable) portion of the interior of the console to store and retrieve items that are not valuable but that the occupant may desire to access quickly, such as facial tissue, cough drops, mints, sunglasses, or the like. Similarly, the false floor in the trunk or the hatch area may enable access to both a lockable sub-compartment and a remaining (e.g., non-lockable) portion below the false floor. Of course, one or more of the compartments may be lockable and may not include a sub-compartment, e.g., based on the size (e.g., volume) of the compartment. For example, a vehicle may provide a lockable glove box that does not include a sub-compartment because the volume of the glove-box is relatively small. In contrast, the console may have sufficient volume to provide a lockable sub-compartment.

The automatic lock/unlock for the doors of the lockable compartments (and sub-compartments) may be provided in one of multiple ways that can be broadly categorized into connecting the locking mechanism for the lockable compartments (or sub-compartments) into (1) the ignition system or (2) the vehicle locking system (e.g., either included in a vehicle from the factory or an aftermarket system). The vehicle locking system is a system in a vehicle used to lock and unlock doors of the vehicle, individually and collectively (e.g., all doors). For example, the vehicle locking system enables an occupant to lock/unlock individual doors and to lock/unlock all the doors of the vehicle from within the vehicle using vehicle-based controls and from outside the vehicle using a key fob, smartphone, nearfield communication (NFC) device, or the like. The vehicle locking system may include a type of remote keyless entry system that enables the doors of the vehicle to be remotely (e.g., wirelessly) locked/unlocked using, for example, a key fob, a smartphone application ("app"), or the like. The ignition system includes a multi-position switch to activate the electrical system of the vehicle, including "accessories" (radio, power windows, etc.). In vehicles powered by internal combustion engines, the switch provides power to the starter solenoid and the ignition system components (including the engine control unit and ignition coil), and is frequently combined with the starter switch which activates the starter motor. Whether the automatic lock/unlock is connected to the vehicle locking system or the ignition system may be a dealer-selectable option or a user-selectable option. For example, the dealer may program the locking mechanism to connect to either the vehicle locking system or the ignition system using a tool available to dealers. As another example, the vehicle's system may enable the user to select whether the locking mechanism is connected to the vehicle locking system or the ignition system.

If the automatic lock/unlock is connected into the ignition system, then the system may be configured to (1) automatically lock the doors of lockable compartments (or sub-compartments) when a first condition occurs and (2) automatically unlock the doors of lockable compartments (or sub-compartments) when a second condition occurs. For example, when the ignition is turned off (e.g., first condition), the doors of the lockable compartments may be automatically locked and when the ignition is turned on (e.g., second condition), the doors of the lockable compartments may be automatically unlocked. In this example, an occupant may store valuables in one (or more) of the lockable compartments before the ignition is turned off, e.g., while the vehicle is stopped and idling. After the transmission of the vehicle is placed in a park position or the ignition is turned off, the lockable compartments may automatically lock, allowing the occupant to leave the vehicle with their valuables locked in the lockable compartment. After returning to the vehicle, turning on the ignition causes the doors to each of the lockable compartment to be automatically unlocked, thereby enabling access to the valuables in the lockable compartment. Of course, in some cases, the first condition may be when the ignition is set to the accessory position (e.g., rather than the ignition on position) and the second condition maybe when the ignition is set to the off position. In still other cases, the first condition may be when the vehicle reaches at least a predetermined speed and the second condition may be when the vehicle has a speed that is below the predetermined speed. For example, some vehicles have a feature that automatically locks the vehicle doors when the vehicle reaches the predetermined speed. The signal used to lock the doors may also automatically be used to unlock the doors of the lockable compartments (or sub-compartments). Vehicles that have a feature to automatically lock the vehicle doors when the vehicle reaches the predetermined speed may automatically unlock the vehicle doors when the ignition is turned off (or a key is removed from the ignition). In such cases, turning the ignition off may automatically lock the doors of the lockable compartments in addition to automatically unlocking the vehicle doors.

If the automatic lock/unlock is connected to the vehicle locking system of the vehicle, then the mechanism used to lock and unlock the vehicle doors is used to lock and unlock the doors of the lockable compartments (or sub-compartments). For example, using a key fob to lock the vehicle may be a first condition that automatically locks the doors of the lockable compartments. Using the key fob to unlock the vehicle may be a second condition that automatically unlocks the doors of the lockable compartments. In this way, an occupant may store valuables in a compartment (or sub-compartment) of the vehicle prior to exiting the vehicle. After exiting the vehicle, locking the vehicle (e.g., locking the doors of the vehicle) using the key fob automatically locks the doors to the lockable compartments in the vehicle. After returning to the vehicle, unlocking the vehicle (e.g., unlocking the doors of the vehicle) using the key fob automatically unlocks the doors of the lockable compartments in the vehicle. Of course, the systems and techniques described herein may be used to connect to any vehicle locking system currently being used to lock and unlock the doors of the vehicle. For example, some vehicles may automatically unlock the vehicle (e.g., unlock the doors of the vehicle) when the key fob is within a predetermined distance (e.g., typically 5 meters or less) of the vehicle. In such cases, when the vehicle locking system detects that the key fob is within the predetermined distance from the vehicle, the vehicle locking system may automatically unlock the lockable compartments (or sub-compartments) in addition to unlocking the doors of the vehicles. As another example, if the vehicle uses a biometric sensor (e.g., fingerprint scanner) built into the vehicle, a combination lock built into the vehicle, a smart phone application ("app"), or another type of lock/unlock mechanism, then the mechanism used to lock the vehicle's doors (e.g., first condition) may also automatically lock the lockable compartments (or sub-compartments) and unlocking the vehicle's doors (e.g., second condition) may also automatically unlock the lockable compartments (or sub-compartments). In some cases, the vehicle locking system may communicate via Bluetooth (or another type of nearfield communication (NFC) such as using a radio frequency identifier (RFID)). For example, the vehicle locking system may pair with a user's smartphone and automatically unlock the vehicle when the smartphone is determined to be within a predetermined distance or less of the vehicle and automatically lock the vehicle when the smartphone is determined to greater than the predetermined distance from the vehicle.

In some cases, one or more of the lockable compartments (or sub-compartments) may be equipped with an override function, such as a key (e.g., to lock/unlock), a combination lock, a biometric lock (e.g., fingerprint scanner), or the like. The override function may be configured in one of two ways. In the first configuration, the override function may be used to override the locking mechanism of individual compartments (or sub-compartments). For example, if a locking mechanism has automatically locked the door of a compartment (or sub-compartment), then the override function may be used to override the locked state and open the locked door of the compartment (or sub-compartment). If the locking mechanism has automatically unlocked the door of the lockable compartment, then the override function may be used to override the unlocked state and lock the door of the compartment. In the second configuration, the override function may disable whether the automatic locking and unlocking takes place for each individual compartment. For example, an occupant may desire that the glovebox remain accessible at all times and set the override of the glovebox such that the glovebox does not lock when the first condition occurs. The occupant may store valuables in the console which locks when the first condition occurs and unlocks when the second condition occurs. In this way, the occupant can configure each compartment individually.

FIG. 1 is a block diagram of a system 100 that includes a vehicle with one or more lockable compartments (or sub-compartments), according to some embodiments. The system 100 includes a vehicle 102 that has a front 104 and a rear 106. A selector 107 may select whether a lock mechanism 112 is connected to a vehicle locking system 108 or to an ignition system 109. In some cases, the dealer may use the selector 107 to connect the lock mechanism 112 to either the vehicle locking system 108 or to the ignition system 109. In other cases, the owner of the vehicle may use the selector 107 to connect the lock mechanism 112 to either the vehicle locking system 108 or to the ignition system 109. In the description of the figures, it should be understood that locking a compartment means locking a door of the compartment to prevent access to the compartment and unlocking a compartment means unlocking a door of the compartment to enable access to the compartment.

Vehicle 102 may include one or more compartments 110, such as, for example, a compartment 110(1) (e.g., glovebox), a compartment 110(2) (e.g., under the driver's seat), a compartment 110(3) (e.g., a console that is placed between the driver's seat and the front passenger seat), a compartment 110(4) (e.g., under the front passenger seat), a compartment 110(5) (e.g., below a first rear seat), a compartment 110(6) (e.g., below a second rear seat), a compartment 110(7) (e.g., behind the rear seats), a compartment 110(8) (e.g., under a false floor in the trunk area or hatch area), or any combination thereof. Of course, the arrangement and number of compartments may vary based on whether the vehicle 102 is left-hand drive or right-hand drive, the size of the vehicle 102, the type (e.g., sedan, coupe, hatchback, crossover, mini-van, truck, special utility vehicle (SUV), or the like) of the vehicle 102, a drivetrain of the vehicle 102 (e.g., internal combustion engine or battery powered electric vehicle), and so on.

One or more of the compartments 110 may have a corresponding lock mechanism 112. For example, the compartment 110(1) may have a lock mechanism 112(1), the compartment 110(2) may have a lock mechanism 112(2), the compartment 110(3) may have a lock mechanism 112(3), the compartment 110(4) may have a lock mechanism 112(4), the compartment 110(5) may have a lock mechanism 112(5), the compartment 110(6) may have a lock mechanism 112(6), the compartment 110(7) may have a lock mechanism 112(7), and the compartment 110(8) may have a lock mechanism 112(8). Of course, some of the compartments 110 may have the lock mechanism 112 while others of the compartments 110 may not have the lock mechanism 112.

One or more of the compartments 110 may include a sub-compartment 114. In such cases, the lock mechanism 112 may be associated with the sub-compartment 114 rather than the compartment 110. For example, the compartment 110(3) (e.g., console) may be accessed by any occupant while the sub-compartment 114(3) may be lockable. As illustrated in FIG. 1, the compartment 110(1) may include a sub-compartment 114(1), the compartment 110(2) may include a sub-compartment 114(2), the compartment 110(3) may include a sub-compartment 114(3), the compartment 110(4) may include a sub-compartment 114(4), the compartment 110(5) may include a sub-compartment 114(5), the compartment 110(6) may include a sub-compartment 114(6), the compartment 110(7) may include a sub-compartment 114(7), and the compartment 110(8) may include a sub-compartment 114(8). Of course, particular ones of the compartments 110 may include a sub-compartment 114 while others of the compartments 110 may not include the sub-compartment 114. For example, those compartments 110 having a volume greater than a particular threshold amount may include the sub-compartment 114 while those compartments 110 having a volume less than or equal to the particular threshold amount may not include the sub-compartment 114.

A key fob 116 may be used to wirelessly turn the vehicle locking system 108 on and off, e.g., causing the vehicle locking system to change from a locked to unlock state, and optionally with the inclusion of an alarm, also an unarmed state to an armed state (alarm on) or causing the vehicle locking system to change from an armed state to an unarmed state (alarm off). For example, selecting a first button of the key fob 116 may cause the vehicle locking system 108 to send a signal 118(1) that causes the vehicle doors 120 to lock and causes the locking mechanisms 112 of the compartments 110 (or sub-compartments 114) to lock. Selecting a second button of the key fob 116 may cause the vehicle locking system 108 to send a signal 118(2) that causes the vehicle doors 120 to unlock and causes the locking mechanisms 112 of the compartments 110 (or sub-compartments 114) to unlock. The signals 118(1), 118(2) are sent to the locking mechanisms 112 via a bus 122 (e.g., a communication bus), such as, for example, a Controller Area Network (CAN) bus, a Media Oriented Systems Transport (MOST) bus, a Vehicle Area Network (VAN) bus, or another type of electronic bus. The bus 122 is an internal communications network that interconnects components inside the vehicle 102. In some cases, the bus 122 may include multiple buses, with each bus using a different protocol. In some cases, the bus 122 may include using a power signal that energizes based on signals received in an ignition on or accessory state on through a relay. When an electronic control unit (ECU) is in one of the states described herein, the ECU may send a signal to a relay block causing the vehicle locking system 108 or the ignition system 109 to become active.

A key 117 may be used to place the ignition system 109 in one of up to four states: (1) accessory-state (e.g., accessory on-state), (2) on-state, (3) start-state, and (4) off-state. The accessory-state enables the occupant(s) to use accessories, such as the infotainment system, windshield wipers, and the like while the engine is off. The on-state enables occupant(s) to operate accessories and use the instrument panel and, in some cases, enables access to engine diagnostic information using the on-board diagnostics (OBD) port. The start-state causes the engine to start, after which the ignition system 109 transitions to the on-state after the engine has been started and is running. The off-state causes the engine to stop and cuts power to the accessories.

If the selector 107 is used to connect the lock mechanisms 112 to the ignition system 109, then the vehicle 102 may (i) send the signal 118(1) to automatically lock the lock mechanisms 112 of the compartments 110 (or sub-compartments 114) when a first condition occurs and (ii) send the signal 118(2) to automatically unlock the lock mechanism 112 of the compartments 110 (or sub-compartments 114) when a second condition occurs. For example, when the ignition system 109 is turned off (e.g., first condition), the ignition system 109 may send the signal 118(1) to the lock mechanisms 112 to automatically lock the compartments 110 (or sub-compartments 114). When the ignition system 109 is turned on (e.g., second condition), the ignition system 109 may send the signal 118(2) to the lock mechanisms 112 to automatically unlock the compartments 110. In this example, an occupant may store an object (e.g., something valuable) in one or more of the compartments 110 before the ignition system 109 is turned off, e.g., while the vehicle 102 is stopped and idling (e.g., ignition system 109 is in the on-state). After the ignition system 109 is turned off (e.g., placed in the off-state), the ignition system 109 may send the signal 118(1), thereby causing the locking mechanism 112 of the compartments 110 to lock, allowing the occupant to leave the vehicle 102 with their valuables locked in one or more the compartments 110 (or sub-compartments 114). After returning to the vehicle 102, turning the ignition system 109 to the accessory-state or the on-state may cause the ignition system 109 to send the signal 118(2) to unlock the locking mechanisms 112, thereby enabling the occupants to access one or more of the compartments 110. Of course, in some cases, the first condition may be when the ignition system 109 is set to the accessory-state (e.g., rather than the on-state) and the second condition maybe when the ignition system is set to the off-state.

If the selector 107 is used to connect the vehicle locking system 108 to the lock mechanisms 112, then the signals 118(1), 118(2) that are used to lock and unlock the vehicle doors 120 may be used to lock and unlock the lock mechanisms 112 of the compartments 110 (or sub-compartments 114). For example, using the key fob 116 to lock the vehicle doors 120 may be a first condition that causes the vehicle locking system 108 to send the signal 118(1) to lock the lock mechanisms 112 of the compartments 110 (or sub-compartments 114). Using the key fob 116 to unlock the vehicle doors 120 may be a second condition that causes the vehicle locking system 108 to send then signal 118(2) to unlock the lock mechanisms 112 of the compartments 110 (or the sub-compartments 114). In this way, an occupant may store valuables in a compartment 110 (or sub-compartment 114) prior to exiting the vehicle 102. After exiting the vehicle 102, locking the vehicle doors 120 using the key fob 116 may automatically cause the vehicle locking system 108 to send the signal 118(1) to lock the locking mechanisms 112 of the compartments 110 (or sub-compartments 114). After returning to the vehicle 102, unlocking the vehicle doors 120 using the key fob 116 causes the vehicle locking system 108 to send the signal 118(2) to unlock the lock mechanisms 112 of the compartments 110 (or the sub-compartments 114). Of course, the lock mechanisms 112 may be connected to other types of vehicle locking systems that may be used to lock and unlock the vehicle doors 120. For example, the vehicle locking system 108 may send the signal 118(2) to unlock the vehicle doors 120 in response to detecting that the key fob 116 is within a predetermined distance (e.g., 5 meters or less) of the vehicle 102. In such cases, when the vehicle locking system 108 detects that the key fob 116 is within the predetermined distance from the vehicle 102, the vehicle locking system 108 may send the signal 118(2) to the locking mechanisms 112 in addition to unlocking the vehicle doors 120. As another example, if the vehicle 102 uses a biometric sensor (e.g., fingerprint scanner), a combination ("tumbler") lock, a keypad, built into the vehicle, a smart phone application ("app"), or another type of lock/unlock system, then the vehicle locking system 108 may send the signal 118(1) to lock the vehicle's vehicle doors 120 (e.g., first condition) and the lock mechanisms 112 of the compartments 110 (or sub-compartments 114) and the vehicle locking system 108 may send the signal 118(2) to unlock the vehicle doors 120 (e.g., second condition) and unlock the lock mechanisms 112 of the compartments 110 (or sub-compartments 114).

In some cases, the first condition may be when the vehicle 102 reaches at least a predetermined speed and the second condition may be when the vehicle 102 reaches a speed that is below the predetermined speed. For example, the vehicle 102 may have a feature that automatically locks the vehicle doors 120 when the vehicle 102 reaches the predetermined speed. When the vehicle 102 is at or above the predetermined speed, the vehicle locking system 108 may send the signal 228(1) and cause the lock mechanisms 112 of the compartments 110 (or sub-compartments 114) to unlock. When the vehicle 102 is below the predetermined speed, the vehicle locking system 108 may send the signal 118(2) and cause the lock mechanisms 112 of the compartments 110 (or sub-compartments 114) to unlock. For example, an electronic control unit (ECU), a type of processor, may monitor an internal bus (e.g., CAN network) to determine a speed of the vehicle 102 and lock the doors 120 when the speed satisfies a particular speed threshold.

In some cases, when the lock mechanisms 112 are locked, attempts to force open one or more of the lock mechanisms 112 may cause the lock mechanisms to send a signal to the vehicle locking system 108 causing the vehicle locking system 108 to activate an audible alarm, a visual alarm, or both. In some cases, if the conditions to trigger the visual and/or audible alarm are satisfied (e.g., an attempt to force the lock mechanisms 112 is detected), then the vehicle locking system 108 may override or disregard an unlock command sent via door unlock buttons provided in an interior of the vehicle 102. Alternately, the vehicle locking system 108 may be designed to respond to an unlock command received via the key fob and ignore an unlock command sent via door unlock buttons provided in an interior of the vehicle 102.

Thus, one or more compartments (or sub-compartments) in a vehicle may have an associated lock mechanism. The lock mechanism may be connected to either the vehicle locking system of the vehicle or the ignition system of the vehicle. For example, when the lock mechanism is connected to the vehicle locking system using a key fob (or other mechanism) to signal to the vehicle locking system to lock the doors of the vehicle may cause the lock mechanism to lock the compartments (or sub-compartments) and using the key fob to signal to the vehicle locking system to unlock the doors of the vehicle may cause the lock mechanism to unlock the compartments (or sub-compartments). As another example, when the lock mechanism is connected to the ignition system of the vehicle, placing the ignition system in an accessory-state or an on-state may cause the lock mechanism to unlock the compartments (or sub-compartments) and placing the ignition system in an off-state may cause the lock mechanism to lock the compartments (or sub-compartments). In this way, one or more occupants of the vehicle can store objects, such as valuables, in the compartments which automatically lock prior to or shortly after the occupants exit the vehicle and automatically unlock prior to or shortly after the occupants enter the vehicle. The lockable compartments enable the occupants of the vehicle to safely store valuables in the vehicle without worrying about their valuables being stolen.

FIG. 2A is a block diagram of a compartment with an override function, according to some embodiments. In some cases, one or more of the compartments 110, such as the representative compartment 110 shown in FIG. 2A, may be equipped with an override 202. The override 202 may include a key, a combination lock, a biometric lock (e.g., fingerprint scanner), or the like. The operation of the override 202 may be dealer selectable, user selectable, or both.

The override 202 may be configured in one of two ways. In a first configuration, the override 202 may be used to override the lock mechanism 112. For example, if the lock mechanism 112 is in a locked state (e.g., due to receiving the signal 118(1)), then the override 202 may be used to override the locked state and change the lock mechanism 112 to an unlocked state to enable an occupant to access the compartment 110. If the lock mechanism 122 is in an unlocked state (e.g., due to receiving the signal 118(2)), then the override 202 may be used to override the unlocked state and place the lock mechanism 122 in a locked state.

In a second configuration, if the override 202 is on, then the signals 118(1), 118(2) sent by the vehicle locking system 108 or the ignition system 109 may have no effect on the lock mechanism 112. For example, if the override 202 is on and the lock mechanism 112 is in a locked state, then the signal 118(2) may have no effect on the lock mechanism 112 and the lock mechanism 112 may remain in the locked state. If the override 202 is on and the lock mechanism 112 is in an unlocked state, then the signal 118(1) may have no effect on the lock mechanism 112 and the lock mechanism 112 remains in the unlocked state. If the override 202 is off, then the signals 118(1), 118(2) sent by the vehicle locking system 108 or the ignition system 109, may change the state of the lock mechanism 112 (e.g., 118(1) change the state to locked and 118(2) changes the state to unlocked), as described above in FIG. 1. The override 202 may enable an occupant to bypass the vehicle locking system 108, similar to a door buzzer in a building, where a resident with a key can insert the key to open a door, and a guest who does not have a key can be let in by a resident of the building "buzzing" in the guest. "Buzzing" in the guest enables a resident of the building to electronically override (e.g., bypass) the door lock using an electric strike plate or similar mechanism.

Figure 2B:
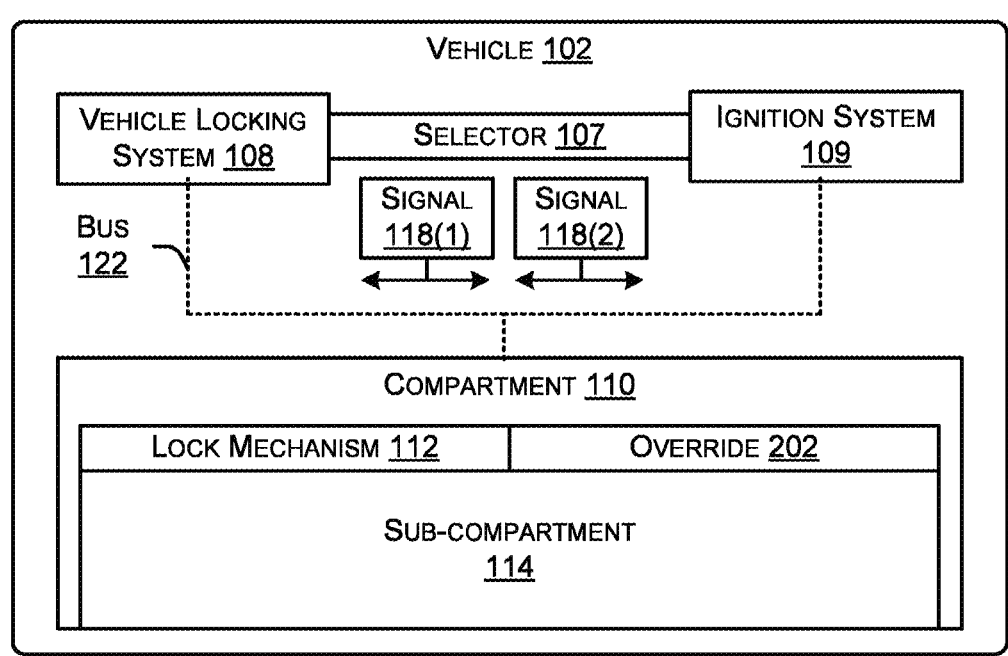
FIG. 2B is a block diagram of a sub-compartment with an override function, according to some embodiments.

FIG. 2B is a block diagram of a sub-compartment with an override function, according to some embodiments. In some cases, one or more of the sub-compartments 114, such as the representative compartment 114 shown in FIG. 2B, may be equipped with the override 202. The override 202 may include a key, a combination lock, a biometric lock (e.g., fingerprint scanner), or the like. The operation of the override 202 may be dealer selectable, user selectable, or both.

The override 202 may be configured in one of two ways. In a first configuration, the override 202 may be used to override the lock mechanism 112. For example, if the lock mechanism 112 is in a locked state (e.g., due to receiving the signal 118(1)), then the override 202 may be used to override the locked state and change the lock mechanism 112 to an unlocked state to enable an occupant to access the sub-compartment 114. If the lock mechanism 122 is in an unlocked state (e.g., due to receiving the signal 118(2)), then the override 202 may be used to override the unlocked state and place the lock mechanism 122 in a locked state, thereby preventing access to the sub-compartment 114.

In a second configuration, if the override 202 is on, then the signals 118(1), 118(2) sent by the vehicle locking system 108 or the ignition system 109 may have no effect on the lock mechanism 112. For example, if override 202 is on and the lock mechanism 112 is in a locked state, then the signal 118(2) may have no effect on the lock mechanism 112 and the lock mechanism 112 may remain in the locked state. If the override 202 is on and the lock mechanism 112 is in an unlocked state, then the signal 118(1) may have no effect on the lock mechanism 112 and the lock mechanism 112 may remain in the unlocked state. If the override 202 is off, then the signals 118(1), 118(2) sent by the vehicle locking system 108 or the ignition system 109, may change the state of the lock mechanism 112 (e.g., 118(1) change the state to locked and 118(2) changes the state to unlocked), as described above in FIG. 1.

Thus, in some cases one or more of the compartments (or sub-compartments) in a vehicle may have an override in addition to a lock mechanism. In a first configuration, if the lock mechanism is in a locked state, then the override may be used to change the lock mechanism to an unlocked state, to enable access to the associated compartment or sub-compartment. If the lock mechanism is in an unlocked state than the override may be used to change the lock mechanism to a locked state, to prevent access to the associated compartment or sub-compartment. In a second configuration, if an occupant turns on the override, then the signals sent by the vehicle locking system or the ignition system may have no effect on the lock mechanism associated with a compartment or a sub-compartment. If an occupant turns off the override, then the vehicle locking system or the ignition system may send signals to change the state of the lock mechanism from a locked state to an unlocked state or from an unlocked state to a locked state.

Figure 3:
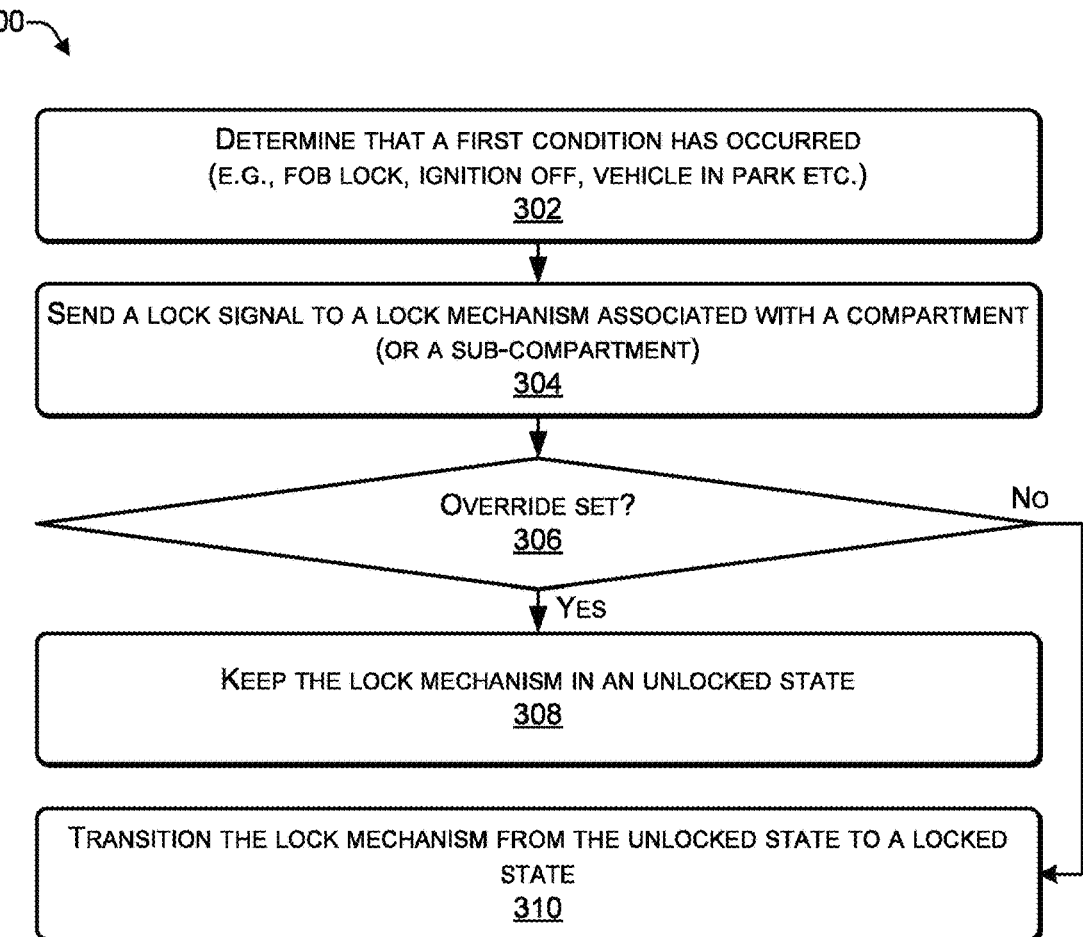
FIG. 3 is a flowchart of a process that includes transitioning a lock mechanism from a locked state to an unlocked state, according to some embodiments.

FIG. 3 is a flowchart of a process 300 that includes transitioning a lock mechanism from a locked state to an unlocked state, according to some embodiments. The process 300 may be performed by a system of a vehicle, such as the system 100 of FIG. 1.

At 302, the process may determine that a first condition has occurred. At 304, the process may send a lock signal to a lock mechanism associated with a compartment or (sub-compartment). For example, in FIG. 2A and FIG. 2B, if the vehicle locking system 108 or the ignition system 109 determine that a first condition has occurred, then the vehicle locking system 108 or the ignition system 109 may send the signal 118(1), via the bus 122, to the lock mechanism 112 associated with the compartment 110 or the sub-compartment 114. To illustrate, if the vehicle locking system 108 determines that a particular key ("lock") of the key fob 116 has been selected (e.g., first condition), then the vehicle locking system 108 sends the signal 118(1), via the bus 122, to the lock mechanism 112 associated with the compartment 110 or the sub-compartment 114. As another illustration, if the ignition system 109 determines that the key 117 has been placed in the off-state or has been removed from the ignition system 109 (e.g., first condition), then the ignition system 109 sends the signal 118(1), via the bus 122, to the lock mechanism 112 associated with the compartment 110 or the sub-compartment 114.

At 306, the lock mechanism may determine whether an override has been set. If a determination is made, at 306, that "yes" the override has been set, then the process proceeds to 308, where the lock mechanism remains in an unlocked state. If a determination is made, at 306, that the override has not been set, then the process proceeds to 310, where the lock mechanism transitions from the unlocked state to a locked state. For example, in FIG. 2A and FIG. 2B, if the override 202 has been set, then the lock mechanism 112 performs no action (e.g., remains unlocked) in response to receiving the signal 118(1). If the override 202 has not been set, then the lock mechanism 112 transitions from an unlocked state to a locked state in response to receiving the signal 118(1).

Thus, the override may be used to prevent lock/unlock signals from affecting the lock mechanism associated with a compartment or a sub-compartment. In a vehicle with multiple compartments (or sub-compartments), an occupant may configure a first set of (one or more) compartments (or sub-compartments) to automatically lock and unlock based on the signals provided by the vehicle locking system or the ignition system and configure a second set of compartments (or sub-compartments) to ignore the signals provided by the vehicle locking system or the ignition system. For example, the occupant may desire that the glovebox remain accessible at all times and may store valuables in the console. To achieve this, the occupant may set the override of the glovebox to ignore the signals and not set the override of the console to enable the console to automatically lock to protect valuables placed in the console.

FIG. 4 is a flowchart of a process 400 that includes transitioning a lock mechanism from an unlocked state to a locked state, according to some embodiments. The process 400 may be performed by a system in a vehicle, such as the system 100 of FIG. 1.

At 402, the process may determine that a second condition has occurred. At 404, the process may send an unlock signal to a lock mechanism associated with a compartment or (sub-compartment). For example, in FIG. 2A and FIG. 2B, if the vehicle locking system 108 or the ignition system 109 determine that a second condition has occurred, then the vehicle locking system 108 or the ignition system 109 may send the signal 118(2), via the bus 122, to the lock mechanism 112 associated with the compartment 110 or the sub-compartment 114. To illustrate, if the vehicle locking system 108 determines that a particular key ("lock" key) of the key fob 116 has been selected (e.g., second condition), then the vehicle locking system 108 sends the signal 118(2), via the bus 122, to the lock mechanism 112 associated with the compartment 110 or the sub-compartment 114. As another illustration, if the ignition system 109 determines that the key 117 has been placed in the on-state or the accessory-state (e.g., second condition), then the ignition system 109 sends the signal 118(2), via the bus 122, to the lock mechanism 112 associated with the compartment 110 or the sub-compartment 114.

At 406, the lock mechanism may determine whether an override has been set. If a determination is made, at 406, that "yes" the override has been set, then the process proceeds to 408, where the lock mechanism remains in a locked state. If a determination is made, at 406, that the override has not been set, then the process proceeds to 410, where the lock mechanism transitions from the locked state to an unlocked state. For example, in FIG. 2A and FIG. 2B, if the override 202 has been set, then the lock mechanism 112 performs no action in response to receiving the signal 118(1). Due to the override 202 being set, the lock mechanism 112 remains in the locked state after receiving the signal 118(1). If the override 202 has not been set, then the lock mechanism 112 transitions from a locked state to an unlocked state in response to receiving the signal 118(1).

Thus, the override may be used to prevent lock/unlock signals from affecting the lock mechanism associated with a compartment or a sub-compartment. In a vehicle with multiple compartments (or sub-compartments), an occupant may configure a first set of (one or more) compartments (or sub-compartments) to automatically lock and unlock based on the signals provided by the vehicle locking system or the ignition system and configure a second set of compartments (or sub-compartments) to ignore the signals provided by the vehicle locking system or the ignition system. For example, the occupant may desire that the glovebox remain accessible at all times and may store valuables in the console. To achieve this, the occupant may set the override of the glovebox to ignore the lock/unlock signals from the ignition system or the vehicle locking system and not set the override of the console to enable the console to automatically lock to protect valuables placed in the console.

Figure 5:
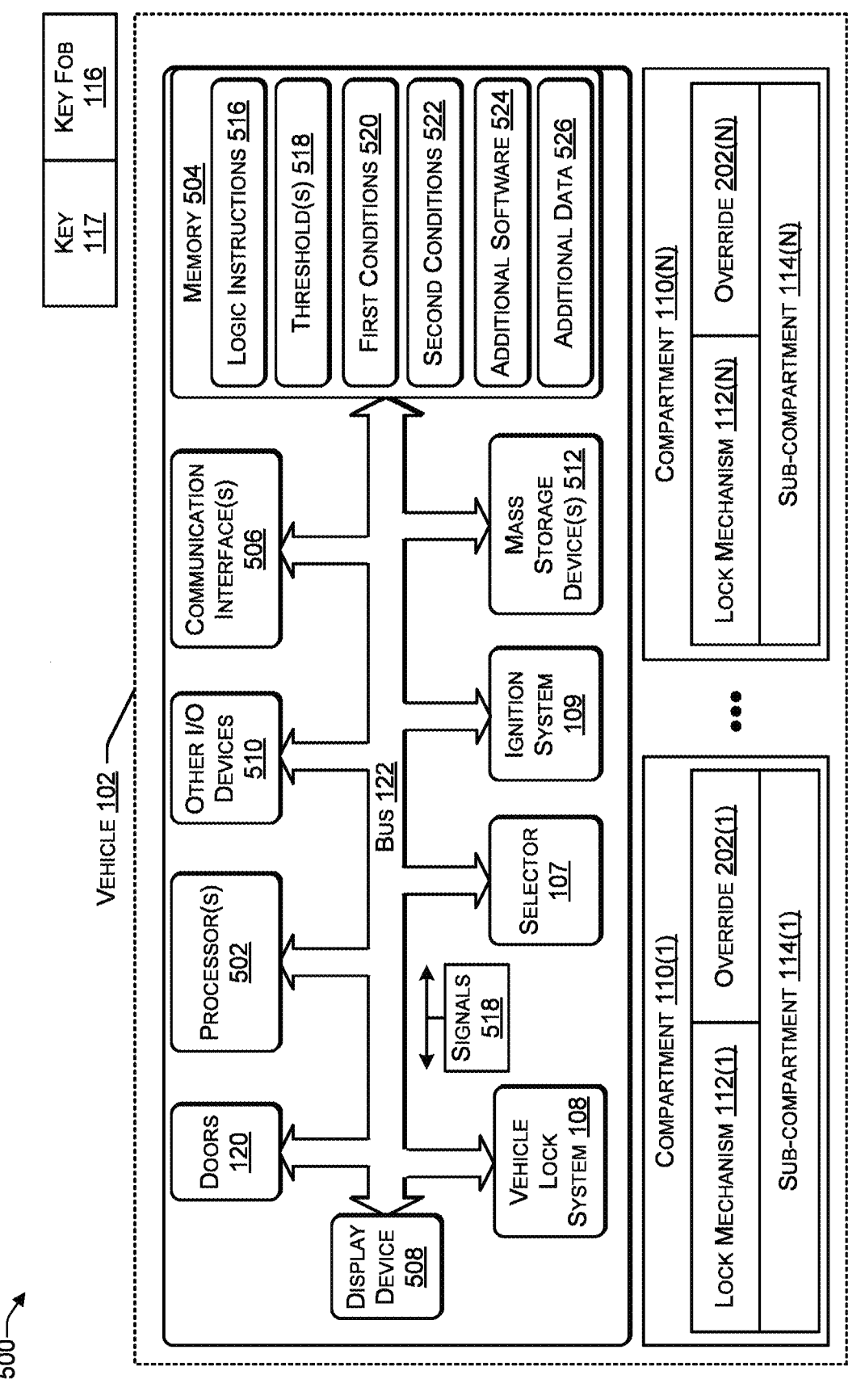
FIG. 5 illustrates an example configuration of a system that can be used to implement the systems and techniques described herein.

FIG. 5 illustrates an example configuration of a vehicle system 500 that can be used to implement the systems and techniques described herein.

The system 500 may include one or more processors 502 (e.g., central processing unit (CPU), graphics processing unit (GPU), electronic control unit (ECU) or the like), a memory 504, communication interfaces 506, a display device 508, other input/output (I/O) devices 510 (e.g., trackball, touchscreen, mouse, and the like), and one or more mass storage devices 512 (e.g., disk drive, solid state disk drive, or the like), configured to communicate with each other, such as via one or more buses 122 or other suitable connections. While a single system bus 122 is illustrated for ease of understanding, it should be understood that the system buses 514 may include multiple buses, including automotive buses such as CAN, MOST, and the like.

The processors 502 are one or more hardware devices that may include a single processing unit or a number of processing units, all of which may include single or multiple computing units or multiple cores. The processors 502 may include a GPU that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The system 500 may include one or more communication interfaces 506 for exchanging data with other devices via a network. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like.

The display device 508 may be used for displaying content (e.g., information and images) to occupants of the vehicle 102. For example, the display device 508 may be located on the dashboard of the vehicle. Other I/O devices 510 may be devices that receive various inputs from an occupant and provide various outputs to the occupant, and may include a keyboard, a touchpad, a mouse, a printer, audio input/output devices, and so forth.

The computer storage media, such as memory 116 and mass storage devices 512, may be used to store software and data, including, for example, logic instructions 516 (e.g., software, firmware, or a combination thereof), thresholds 518, first conditions 520, second conditions 522, additional software, and additional data 526. For example, the thresholds 518 may include a distance threshold such that when the key fob 116 is less than the distance threshold from the vehicle, the vehicle locking system 108 detects the key fob 116 and automatically unlocks the vehicle doors 120 and the lock mechanisms 112. The first conditions 520 may include conditions that cause the signal 518(1) to be sent to lock the lock mechanisms 112. For example, the first conditions 520 may include receiving a selection of "lock" on the key fob 116, turning the ignition off, removing the key 117 from the ignition system 109, or the like. The second conditions 522 may include conditions that cause the signal 518(2) to be sent to lock the lock mechanisms 112. For example, the first conditions 522 may include receiving a selection of "unlock" on the key fob 116, turning the ignition to an on-state, turning the ignition to an accessory-state, starting the engine, the vehicle 102 having a speed greater than a predetermined speed threshold, or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A vehicle locking system comprising:
one or more compartments, wherein each compartment comprises a sub-compartment;
a plurality of lock mechanisms for locking and unlocking a door to access a corresponding sub-compartment;
one or more processors; and
one or more non-transitory storage media to store instructions executable by the one or more processors to perform operations comprising:
determining that a first condition has occurred; and
sending, based at least in part on determining that the first condition has occurred, a lock signal to one or more of the plurality of lock mechanisms, wherein the lock signal is capable of causing said one or more lock mechanisms to transition to a locked state, and the locked state of said one or more lock mechanisms is capable of preventing the door from being opened;
determining that a second condition has occurred; and
sending, based at least in part on determining that the second condition has occurred, an unlock signal to one or more of the plurality of lock mechanisms of the door to the sub-compartment, wherein the unlock signal is capable of causing said one or more lock mechanisms to transition to an unlocked state, and the unlocked state of said one or more lock mechanisms is capable of enabling the door to be opened to access the sub-compartment.

2. The system of claim 1, wherein each of the plurality of lock mechanisms is associated with a particular sub-compartment of the one or more compartments, wherein the one or more sub-compartments comprises a console between driver's seat and a front passenger seat.

3. The system of claim 1, wherein the operations further comprise:
detecting an attempt to force open one or more of the plurality of lock mechanisms and activating one or more of an audible or visual alarm.

4. The system of claim 1, wherein determining that the first condition has occurred comprises wirelessly receiving a lock instruction from a key fob associated with a vehicle.

5. The system of claim 1, wherein determining that the first condition has occurred comprises determining that an ignition system of a vehicle has been placed in an off-state.

6. The system of claim 1, wherein determining that the first condition has occurred comprises determining that a transmission of a vehicle has been placed in a park position.

7. The system of claim 1, wherein determining that the first condition has occurred comprises determining that a key has been removed from an ignition system of a vehicle.

8. The system of claim 1, wherein the system further comprises a selector for selecting whether one or more of the plurality of lock mechanisms connected to the vehicle locking system or to an ignition system of a vehicle.

9. The system of claim 1, wherein each of the plurality of lock mechanisms is associated with a particular sub-compartment of the one or more compartments, wherein the one or more sub-compartments consist of a sub-compartment below a rear seat.

10. The system of claim 1, wherein each of the plurality of lock mechanisms is associated with a particular sub-compartment of the one or more compartments, wherein the one or more sub-compartments consist of one or more of a glovebox, a sub-compartment under a driver's seat, a sub-compartment under the front passenger seat, a sub-compartment behind the rear seats, a sub-compartment under a false floor in a trunk area, or any combination thereof.

11. The system of claim 9, wherein the one or more sub-compartments further comprises a first set of sub-compartments and a second set of sub-compartments, wherein the operations further comprise:
sending, based at least in part on determining that the first condition has occurred, a lock signal to the plurality of lock mechanisms for the first set of sub-compartments, wherein the lock signal is capable of causing lock mechanisms of the first set of sub-compartments to transition to a locked state, and the locked state of lock mechanisms is capable of preventing the doors for the first set of sub-compartments from being opened; and
not sending, based at least in part on determining that the first condition has occurred, a lock signal to the plurality of lock mechanisms for the second set of sub-compartments.

12. A method of locking and unlocking a vehicle sub-compartment comprising:
determining that a first condition has occurred; and
sending, based at least in part on determining that the first condition has occurred, a lock signal to a lock mechanism, wherein the lock signal is capable of causing the lock mechanism to
transition to a locked state, and the locked state of the lock mechanism is capable of preventing a door to a sub-compartment within the vehicle compartment from being opened;
determining that a second condition has occurred; and
sending, based at least in part on determining that the second condition has occurred, an unlock signal to the lock mechanism of the door to the sub-compartment, wherein the unlock signal is capable of causing the lock mechanism to transition to an unlocked state, and the unlocked state of the lock mechanism is capable of enabling the door to be opened to access the sub-compartment.

13. The method of claim 12, wherein determining that the second condition has occurred comprises:
determining that an ignition system of the vehicle has been placed in an on-state;
determining that the ignition system has been placed in an accessory-state;
determining that a transmission of the vehicle has been placed in a park position; or
determining that a speed of the vehicle is greater than a pre-determined threshold;
wherein the method is performed by a processor associated with driver's seat.

14. The method of claim 12, wherein the method further comprises:
determining, based at least in part on determining that the second condition has occurred, whether an override function associated with the sub-compartment has been set;
sending, based at least in part on determining that the override function has not been set, an unlock signal to the lock mechanism of the door to the sub-compartment; and
not sending, based at least in part on determining that the override function has been set, the unlock signal to the lock mechanism of the door to the sub-compartment.

15. The method of claim 12, wherein determining that the first condition has occurred comprises wirelessly receiving a lock instruction from a key fob associated with a vehicle.

16. The method of claim 12, wherein determining that the first condition has occurred comprises determining that an ignition system of the vehicle has been placed in an off-state.

17. The method of claim 12, wherein determining that the first condition has occurred comprises determining that a transmission of the vehicle has been placed in a park position.

18. The method of claim 12, wherein the sub-compartment comprises a console between the driver's seat and a front passenger seat.

19. The method of claim 12, wherein the sub-compartment consists of one or more of a glovebox, a sub-compartment under a driver's seat, a sub-compartment under the front passenger seat, a sub-compartment behind the rear seats, a sub-compartment under a false floor in a trunk area, or any combination thereof.

20. The method of claim 12, wherein the sub-compartment consists of a sub-compartment below a rear seat.

21. A vehicle locking system comprising:

one or more sub-compartments within a vehicle, wherein each sub-compartment further comprises a door to access the sub-compartment and a lock mechanism for locking and unlocking the door;

one or more processors; and one or more non-transitory storage media to store instructions executable by the one or more processors to perform operations comprising:

determining that a first condition has occurred; and sending, based at least in part on determining that the first condition has occurred, a lock signal to the lock mechanism, wherein the lock signal is capable of causing the lock mechanism to transition to a locked state, and the locked state of the lock mechanism is capable of preventing the door from being opened;

wherein the one or more sub-compartments comprises a console between driver's seat and a front passenger seat.

22. The system of claim 21, the operations further comprising:

detecting an attempt to force open one or more of lock mechanisms and activating one or more of an audible or visual alarm.

\* \* \* \* \*